US009248698B2

(12) United States Patent
McKinnon et al.

(10) Patent No.: US 9,248,698 B2
(45) Date of Patent: Feb. 2, 2016

(54) WHEEL FRAME

(75) Inventors: Peter R. McKinnon, Foster (AU);
Gerry Taylor, Carlsbad, CA (US)

(73) Assignee: Rotacaster Wheel Ltd., Tighes Hill, New South Wales (AU)

( * ) Notice: Subject to any disclaimer, the term of this patent is extended or adjusted under 35 U.S.C. 154(b) by 773 days.

(21) Appl. No.: 13/138,032

(22) PCT Filed: Oct. 25, 2010

(86) PCT No.: PCT/AU2010/001419
§ 371 (c)(1),
(2), (4) Date: Oct. 7, 2011

(87) PCT Pub. No.: WO2011/047443
PCT Pub. Date: Apr. 28, 2011

(65) Prior Publication Data
US 2012/0019048 A1      Jan. 26, 2012

(30) Foreign Application Priority Data

Oct. 23, 2009   (AU) ................................ 2009905168

(51) Int. Cl.
| B60B 19/12 | (2006.01) |
| B60B 19/00 | (2006.01) |
| B60B 33/00 | (2006.01) |

(52) U.S. Cl.
CPC ............... *B60B 19/12* (2013.01); *B60B 19/003* (2013.01); *B60B 33/0028* (2013.01);
(Continued)

(58) Field of Classification Search
CPC ...... B60B 19/003; B60B 19/12; B60B 19/125
USPC ................ 301/5.1, 5.23; 16/18 R, 45, 46, 47; 180/7.1, 7.2, 20, 21; 29/894, 894.3, 29/897.2
See application file for complete search history.

(56) References Cited

U.S. PATENT DOCUMENTS

| 1,326,679 A | 12/1919 | MacBeth et al. |
| 3,040,371 A | 6/1962 | Rice et al. |
| (Continued) | | |

FOREIGN PATENT DOCUMENTS

| AU | 561380 B2 | 5/1987 |
| CA | 2622950 A1 | 3/2007 |
| (Continued) | | |

OTHER PUBLICATIONS

International Search Report PCT/AU2010/001419 dated Dec. 21, 2010.

(Continued)

*Primary Examiner* — Kip T Kotter
*Assistant Examiner* — Jean Charleston
(74) *Attorney, Agent, or Firm* — TraskBritt, P.C.

(57) ABSTRACT

A method of assembling a wheel rotatable about a main axis and having a plurality of peripheral rollers mounted on peripheral axles aligned tangentially about the wheel and radially spaced from the main axis, each peripheral axle joined to adjacent other peripheral axles to form a continuous ring comprising the peripheral axles, the method including the steps of: molding each peripheral axle in a die having a cylindrical cycle for forming the axle shaft of the peripheral axle without longitudinal separation tines, the peripheral axles each having a receiving head portion for receiving a free end of the axle shaft of an adjacent peripheral axle; mounting a roller on each axle shaft; joining the peripheral axles together to form a continuous ring of peripheral axles; and molding a wheel body including a support structure around the continuous ring.

27 Claims, 17 Drawing Sheets

(52) U.S. Cl.
CPC ........ *B60B 33/0039* (2013.01); *B60B 33/0049* (2013.01); *B60B 2200/40* (2013.01); *B60B 2200/432* (2013.01); *B60B 2310/204* (2013.01); *B60B 2310/316* (2013.01); *B60B 2360/32* (2013.01); *B60B 2380/14* (2013.01); *B60B 2380/50* (2013.01); *B60B 2900/351* (2013.01); *B62B 2301/02* (2013.01); *Y10T 29/49481* (2015.01)

(56) References Cited

U.S. PATENT DOCUMENTS

| | | | |
|---|---|---|---|
| 3,363,735 | A | 1/1968 | Hotchkiss |
| 3,465,843 | A | 9/1969 | Guinot |
| 3,621,961 | A | 11/1971 | Stumpf |
| 3,647,236 | A | 3/1972 | Hayes |
| 3,655,212 | A | 4/1972 | Krass |
| 3,666,285 | A | 5/1972 | Fertig |
| 3,789,947 | A | 2/1974 | Blumrich |
| 3,878,927 | A | 4/1975 | Murakami |
| 3,882,885 | A | 5/1975 | McCain et al. |
| 3,944,094 | A | 3/1976 | Compton |
| 3,961,694 | A | 6/1976 | Murakami |
| 4,006,810 | A | 2/1977 | Kornylak |
| 4,223,753 | A | 9/1980 | Bradbury et al. |
| 4,335,889 | A | 6/1982 | Cather, Jr. et al. |
| 4,460,189 | A | 7/1984 | Goff et al. |
| 4,598,782 | A | 7/1986 | Ilon et al. |
| 4,681,330 | A | 7/1987 | Misawa |
| 4,715,460 | A | 12/1987 | Smith et al. |
| D294,074 | S | 2/1988 | Sogge |
| 4,926,952 | A | 5/1990 | Farnam |
| D309,254 | S | 7/1990 | Guile |
| 4,981,203 | A | 1/1991 | Kornylak |
| 5,035,314 | A | 7/1991 | Kornylak |
| D318,791 | S | 8/1991 | Guile |
| 5,118,124 | A | 6/1992 | Storay |
| 5,213,176 | A | 5/1993 | Oroku et al. |
| D340,342 | S | 10/1993 | Nummelin et al. |
| 5,323,867 | A | 6/1994 | Griffin et al. |
| 5,404,984 | A | 4/1995 | Hagman |
| 5,415,215 | A | 5/1995 | Covert et al. |
| 5,445,399 | A | 8/1995 | Salvucci |
| 5,536,074 | A | 7/1996 | Hsu et al. |
| 5,779,251 | A | 7/1998 | Meier et al. |
| 5,947,491 | A | 9/1999 | Meier et al. |
| 5,971,693 | A | 10/1999 | Story et al. |
| D426,692 | S | 6/2000 | Swanink |
| D439,721 | S | 3/2001 | Swanink |
| 6,315,109 | B1 | 11/2001 | Dean |
| 6,340,065 | B1 | 1/2002 | Harris |
| 6,341,788 | B1 | 1/2002 | Ciccone |
| 6,357,765 | B1 | 3/2002 | Heien |
| 6,364,328 | B1 | 4/2002 | Stahler, Sr. |
| 6,394,203 | B1 | 5/2002 | Harris |
| 6,547,340 | B2 | 4/2003 | Harris |
| 6,619,823 | B2 | 9/2003 | Dai |
| 6,796,618 | B2 | 9/2004 | Harris |
| 6,857,707 | B2 | 2/2005 | Guile |
| 6,923,457 | B2 | 8/2005 | Nogaki |
| D516,767 | S | 3/2006 | Layne |
| 7,083,174 | B2 | 8/2006 | Kane |
| 7,219,903 | B2 | 5/2007 | Grooters et al. |
| 7,318,628 | B2 * | 1/2008 | Guile ............ 301/5.23 |
| 7,431,148 | B2 | 10/2008 | Li et al. |
| 7,500,682 | B1 | 3/2009 | Del Marmol |
| 7,566,102 | B2 * | 7/2009 | Guile ............ 301/5.23 |
| 7,621,355 | B2 * | 11/2009 | Chu et al. ........ 180/7.2 |
| 7,641,288 | B1 | 1/2010 | Baker et al. |
| 7,878,284 | B1 | 2/2011 | Shultz |
| 7,980,335 | B2 | 7/2011 | Potter |
| D658,843 | S | 5/2012 | Wedemeyer |
| D676,214 | S | 2/2013 | McKinnon et al. |
| 8,496,299 | B2 * | 7/2013 | Brudniok ............ 301/5.23 |
| 8,556,279 | B2 | 10/2013 | McKinnon |
| 2002/0057010 | A1 | 5/2002 | Harris |
| 2004/0256818 | A1 | 12/2004 | Amsili |
| 2005/0134106 | A1 | 6/2005 | Guile |
| 2007/0096541 | A1 | 5/2007 | Guile |
| 2008/0018167 | A1 | 1/2008 | Fuji |
| 2009/0278325 | A1 | 11/2009 | Geels et al. |

FOREIGN PATENT DOCUMENTS

| | | | |
|---|---|---|---|
| CN | 101417586 | A | 4/2009 |
| CN | 201342911 | Y | 11/2009 |
| CN | 202011305 | U | 10/2011 |
| CN | 102700358 | A | 10/2012 |
| DE | 3702660 | A1 | 8/1988 |
| GB | 1408820 | A | 10/1975 |
| GB | 2242173 | A | 9/1991 |
| GB | 2242858 | A | 10/1991 |
| GB | 2408692 | | 6/2005 |
| JP | 11/227404 | | 8/1999 |
| JP | 2000335726 | A | 12/2000 |
| JP | 2003267259 | A | 9/2003 |
| JP | 2003276402 | A | 9/2003 |
| JP | 2004359149 | A | 12/2004 |
| JP | 3726558 | B2 | 12/2005 |
| JP | 2007/22342 | | 2/2007 |
| JP | 4003082 | B2 | 11/2007 |
| JP | 4483206 | B2 | 6/2010 |
| KR | 101013676 | B1 | 2/2011 |
| KR | 1020120056950 | A | 6/2012 |
| WO | 0012327 | A1 | 3/2000 |
| WO | 0179007 | A1 | 10/2001 |
| WO | WO 02/24471 | | 3/2002 |
| WO | 0246031 | A1 | 6/2002 |
| WO | 2004014667 | A1 | 2/2004 |
| WO | WO 2004/014667 | | 2/2004 |
| WO | 2010127985 | A1 | 11/2010 |
| WO | WO 2011/047443 | | 4/2011 |
| WO | 2011148017 | A1 | 12/2011 |

OTHER PUBLICATIONS

PCT International Preliminary Report on Patentability and Written Opinion, PCT/AU2010-001419, dated Apr. 24, 2012.
U.S. Appl. No. 29/419,172, filed Apr. 25, 2012, McKinnon et al., Wheel Frame.
Facility Safety Management magazine dated Apr. 2011, Self-Supporting & Balanced.
Material Handling Wholesaler magazine dated Oct. 2, 2009, New ergonomic Rotatruck Self Supporting Hand Truck nominated for annual NSW Safe Work Award.
dorsaVi outcome summary of handtruck assessment and comparison, date issued Jun. 5, 2011.
dorsaVi handtruck assessment-full report, dated Apr. 2011.
Roll Flex & Ergo Roll, <http://www.ergotechinc.com/op_ergo_roll.htrn> (as archived by Internet Archive WayBackMachine with a date range of Oct. 21, 2008 to Sep. 28, 2010).
The freedom of motion! <www.marx-rollentechnik.de/englisch/index.php>, at least Oct. 9, 2009 (as archived by Internet Archive WayBackMachine search run on Aug. 15, 2012).
All-side rollers, <http://www.traporol.de/all-side-rollers.htrnl>, at least Oct. 19, 2008 (as archived by Internet Archive WayBackMachine search run on Aug. 15, 2012).
Kornylak Corporation, Conveyor Wheels, Ornni Directional, BiDirectional, Powered & Robot Wheels, <http://www.kornylak.com/wheels/wheels.htrnl>, (as archived by Internet Archive WayBackMachine search run on Aug. 15, 2012.).

* cited by examiner

FIG. 1m  SECTION A-A  FIG. 1o

SECTION B-B  FIG. 1w

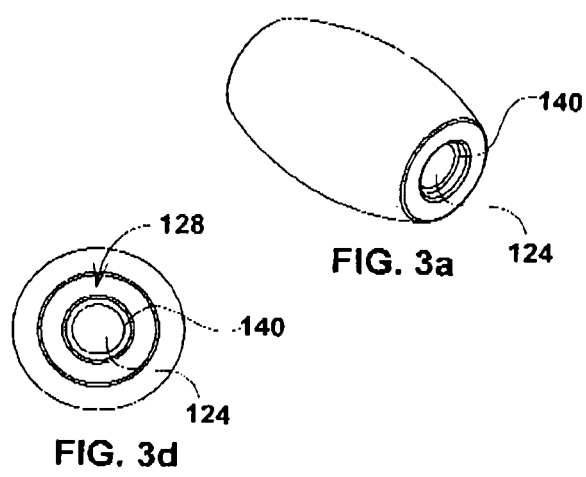
FIG. 3a
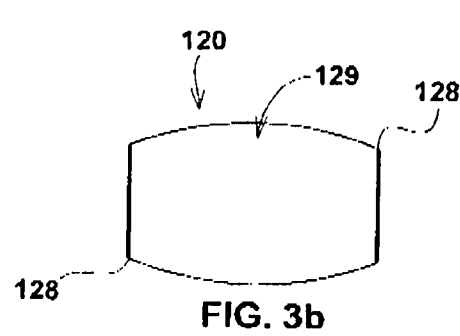
FIG. 3b
FIG. 3d
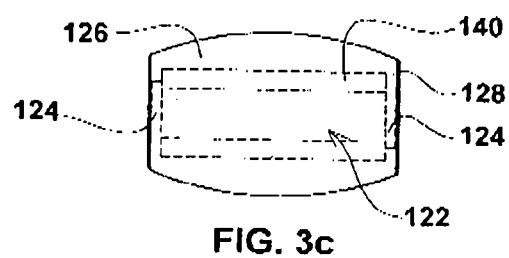
FIG. 3c

SECTION A-A

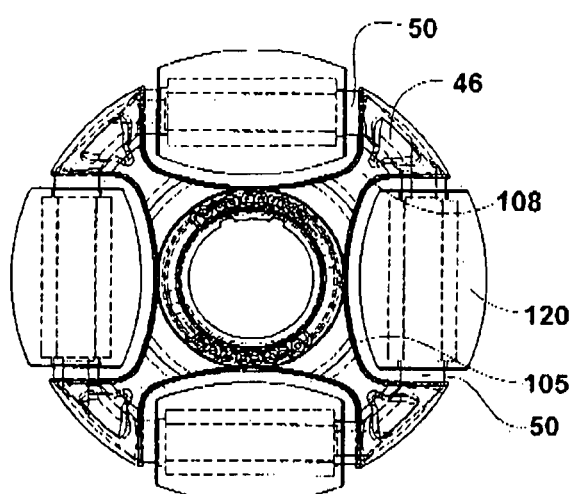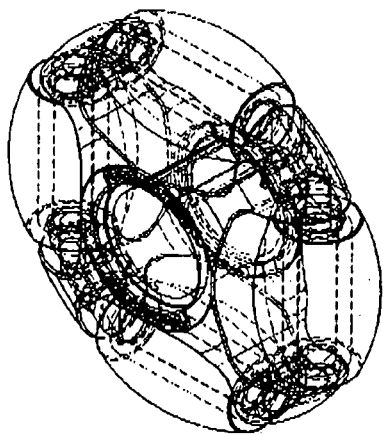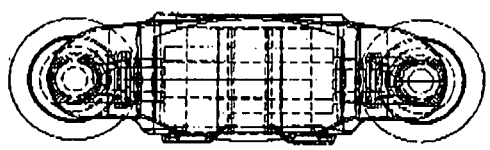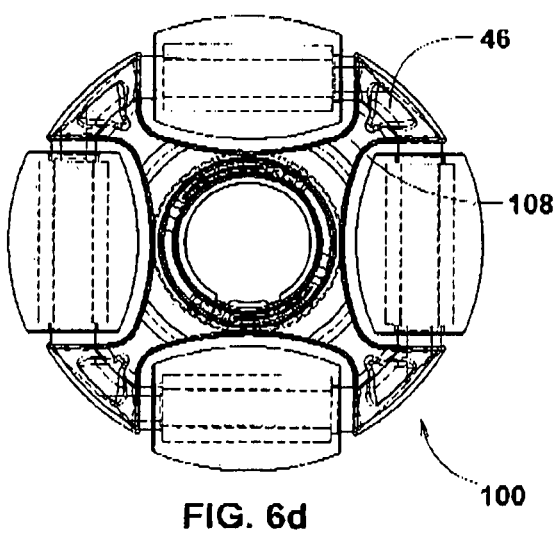
FIG. 6a
FIG. 6b
FIG. 6c
FIG. 6d

SECTION E-E

WHEEL FRAME

CROSS-REFERENCE TO RELATED APPLICATION

This is a national phase entry under 35 U.S.C. §371 of International Patent Application PCT/AU2010/001419, filed Oct. 25, 2010, published in English as International Patent Publication WO 2011/047443 A1 on Apr. 28, 2011, which claims the benefit under Article 8 of the Patent Cooperation Treaty to Australian Patent Application Serial No. 2009905168, filed Oct. 23, 2009.

TECHNICAL FIELD

This invention relates to a wheel. More particularly, this invention relates to a wheel frame. Still more particularly, this invention relates to a wheel frame for a wheel having a plurality of peripheral rollers capable of rotating about peripheral axes aligned normal to the main axis of rotation of the wheel.

BACKGROUND

The following references to, and descriptions of, prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

A type of wheel capable of multiple directional travel (while the main axis of rotation remains oriented in the same direction) has been described variously as an omniwheel and multi-directional wheel. Such wheels include a central hub rotatable about a main axis and a plurality of independently mounted rotatable rollers located about the rim of the hub. The rollers are each capable of rotation about an axis normal to and radially spaced from the main axis, whereby the wheel is capable of moving in a first direction in which the wheel rotates about the main axis or in a transverse direction in which one or more rollers contacting the ground rotate about their corresponding axes.

One such wheel has been described in International Patent Application No. PCT/AU01/01175 (publication No. WO02/24471). The multiple directional wheel described therein comprised a circular wheel frame having a plurality of circumferentially spaced peripheral axles on which were mounted a pair of parallel rings of rollers offset relative to one another. The frame included an integrally formed polyaxled ring that required the rollers to be molded over the axles and limited the range of molding techniques that could be utilized. The rollers rotated about multiple axes normal to a main axis of the wheel. The roller axes were each aligned substantially normal to lines extending radially from the main axis through the midpoint of each roller axis. The rollers were positioned to provide a large overlap (20%-35% in side view) of effective ground contacting surface between diagonally adjacent rollers.

Further improvement to such types of wheels has been described in International Patent Application No. PCT/AU2003/001002 (publication No. WO2004/014667), the entire contents of which is herein incorporated by reference. That disclosure described a method of construction of a frame on which was mounted a single row of rollers. The single row frames were able to be joined to like frames, in offset orientation, to form multiple rowed wheels having good ground contacting overlap between diagonally adjacent rollers. The method of forming the wheel involved each roller being mounted onto a wrap-around bush, which, in turn, was mounted to one of the multiple axles.

An object of the present invention is to ameliorate the aforementioned disadvantages of the prior art or to at least provide a useful alternative thereto.

DISCLOSURE

Accordingly, in one aspect of the invention, there is provided a wheel rotatable about a main axis and having a plurality of peripheral rollers mounted on peripheral axles aligned tangentially about the wheel and radially spaced from the main axis, each peripheral axle joined to adjacent other peripheral axles to form a continuous ring.

Each peripheral axle may be molded in a single molding process. The peripheral axle may include an axle shaft. In a particularly preferred embodiment, the peripheral axle die may be configured to produce no mold parting or separation lines extending longitudinally along the axle shaft. The peripheral axle may be molded in a die that produces no mold parting or separation lines on or around the axle shaft. Preferably, all or part of the length of the axle shaft of each peripheral axle is molded in a die that defines a cylindrical cavity. Although not preferred, if the relevant portion of the die must include two or more components that combine to define the required cavity, the mold separation line should extend laterally, but not longitudinally, on the axle shaft, for example, along an annular step portion at a location along the length of the axle shaft.

The peripheral axle may include a head. The head may be sized and configured to receive a free end of an axle shaft of an adjacent peripheral axle. A portion of the die for molding the head may comprise components that form a lateral or longitudinal separation line during molding of the peripheral axle.

The head may define a bore configured to receive a free end of an axle shaft of an adjacent peripheral axle. The bore may be defined by a mouth extending from the head. The mouth and the bore may be cylindrical and/or conical in shape. Preferably, the mouth and the bore are cylindrical.

In a particularly preferred embodiment, the mouth is molded in a component of the die that produces no mold parting lines along the length of the cylinder or cone forming the mouth. Accordingly, the peripheral axle die preferably further includes a component that defines a cylindrical or conical cavity to form the mouth without producing mold parting lines and, particularly, mold parting lines extending longitudinally along the mouth.

The mouth may be wholly or partially cylindrical and/or wholly or partially conical in internal and external shape. Similarly, the axle shall may be uniformly cylindrical or may be frusto-conical in shape. The axle shaft may he partly conical in shape, particularly proximal to its free end. Accordingly, the axle shaft and mouth may each be molded in a die component defining a cylindrical or conical structure, or a combination of both. This enables the axle shaft and mouth to be formed in a single die component defining a cylindrical or conical cavity that completely surrounds the component to be formed. This die arrangement may have the effect that no mold parting lines extending longitudinally are formed on the axle shaft and mouth components so these components, having a closely circular cross-section at any point along their length, may be formed to have a round cross-section to a high degree of accuracy. This enables the axle shaft to mouth components to be uniformly and consistently molded accurately round without blemishes and shape inconsistencies, enabling manufacturing to low tolerances with resultant minimal play between moving parts.

The peripheral axle head portion may be separately formed from the peripheral axle shaft portion, although this is not preferred as it would add to the number of components required for a particular wheel.

Each head effectively forms a corner of the continuous ring. The head may include an annular shoulder at one end to retain the roller on the axle shaft. The other end of the head includes the mouth. The head includes a corner portion wherein the mouth bore has a longitudinal axis set at ail angle $\theta$ (theta) relative to the longitudinal axis of the axle shaft. The general angle $\theta$ (theta) may be determined by the algorithm $180-360/n$, where n equals the number of peripheral rollers lying in a single plane on the continuous ring. Correspondingly, n equals the number of peripheral axles constituting the continuous ring.

Accordingly, the wheel may comprise three or more rollers up to a practical maximum of ten rollers. Based on the above formula, the angle $\theta$ (theta) for a head of a triple roller wheel is about 60°. The angle $\theta$ (theta) for a head of a four roller wheel is about 90°.

The axle shaft may terminate in a free end that is the same radius as the remainder of the axle shaft. That is, the axle shaft has a consistently round cross-section throughout its length. Alternatively, the axle shaft may include a stepped terminating portion that has a smaller or larger radius than the main body of the axle shaft. The terminating portion may be sized and configured to be received in the mouth. Accordingly, the radius of the mouth bore may be smaller than the radius of the main body of the axle shaft and the external cylindrical or conical wall of the mouth may have a greater diameter than the diameter of the axle shaft main body at the juncture. In this way, the mouth may perform as an annular shoulder effective to retain a roller on the axle shaft between the head of the peripheral axle on which the roller is mounted and the head of an adjacent peripheral axle.

The mouth bore may be a through-bore extending through from the mouth to an open end at the back of the head. The through-bore may be effective to permit the terminal end of the axle shaft to be in contact with an over-molded support of the wheel body. The through-bore may thus provide an opening into which the over-molded wheel body may extend during the molding process to reinforce the connection between the axle shaft and the head to provide the combined structure of the axles and the over-molded wheel body that is of greater strength and rigidity than if the over-molding did not so extend into the interstitial spaces of the axle head. The terminal end butt of the axle shaft may be shaped at an angle transverse to the longitudinal axis of the axle shaft to permit a greater length of axle shaft to be inserted into the mouth bore while conforming to the corner portion shape. The joint between the axle shaft and the head of an adjacent peripheral axle may be further strengthened by adhesive, heat fusion, ultrasonic or other known joining or welding techniques.

The wheel preferably further comprises a wheel body or frame. The wheel body may include a hub or central aperture defining a main axle or central bore. Extending from the hub or an inner rim of the wheel body may be a plurality of outwardly extending supports. The outwardly extending supports may extend radially from the center of the wheel body. The outer ends of the supports may secure the heads. Preferably, the wheel body is formed at least partially around the heads. The heads may be mounted on or in the outwardly extending supports. The outwardly extending supports may partially or wholly surround the heads, provided that the supports do not interfere with the movement of the rollers.

The wheel components may be made from a number of different materials and may comprise a composite of components made from different materials. However, the skilled person will appreciate that a wide variety of suitable materials may be employed, depending on the application and strength and wear demands on the wheels.

For example, the peripheral axles may be made from high-strength molded plastic, cast steel, or a composite of two or more different materials. For example, axles may include a molded plastic casing reinforced with inner metal rods or other reinforcing structures.

Alternatively, the peripheral axle may be constructed such that the axle shaft consists of a metal rod with no plastic over-mold, except about the shaft end attached to the axle head, the head consisting of a plastic molded component.

The bushings may be made from high-strength extruded plastic over which the rollers may be molded. Accordingly, the bushings may be inserts molded inside, for example, polyurethane elastomeric rollers.

The bushings may be shaped to follow the contours of the roller tyre. For example, the external surface of the bushing may have a plurality or annular ribs aligned laterally relative to the bushing's longitudinal axis to better grip the tyre (preferably over-molded) and be effective against longitudinal slippage or movement of the tyre relative to the bushing. Preferably, however, the external surface has a plurality of longitudinal ribs. Advantageously, the longitudinal ribs are arc or bow shaped to follow the general cigar shape of the roller's external shape. The arched ribs are preferably solid and integral to the general cylindrical core of the bushing throughout their lengths, although they may be supported only at their ends and bowed in the middle. Longitudinally aligned ribs will reduce relative movement between the ribs and the tyre as the roller rolls about its longitudinal roller axis, strengthening the joint and extending the life of the roller.

In another aspect, the invention provides a method of assembling a wheel rotatable about a main axis and having a plurality of peripheral rollers mounted on peripheral axles aligned tangentially about the wheel and radially spaced from the main axes. Each peripheral axle being joined to adjacent other peripheral axles to form a continuous ring, the method including the steps of:

molding each peripheral axle in a die having a cylindrical cavity for forming the axle shaft of the peripheral axle without longitudinal separation lines, the peripheral axles each having a receiving head portion for receiving a free end of the axle shaft of an adjacent peripheral axle;

mounting a roller on the axle shaft;

joining the peripheral axles together to form a continuous ring of peripheral axles; and molding a wheel body including a support structure around the continuous ring.

The wheel body may include a central hub to be rotatably mounted on the main axle.

The support structure may include a plurality of outwardly extending arms that support the receiving heads in spaced relationship to the main axes.

The step of mounting a roller on each axle shaft may be preceded by the step of first forming a bush as a sleeve to be mounted on the axle shaft. The corresponding roller may be molded around the bush prior to mounting on the axle shaft. The step of mounting the roller on each axle shaft may include inserting the bush into a roller and then inserting the axle shaft into the corresponding bush and roller.

The head may further include spurs, ridges or other surface features that permit greater adherence to a structure molded about the head or a segment thereof. The spur or other surface features may serve to increase the surface area between the adhering wheel body and the receiving head thereby strengthening and reinforcing the joint and increasing the strength and rigidity of the wheel structure.

The receiving head may include a mouth defining a short bore, the mouth forming an annular shoulder on the axle shaft to trap the corresponding roller on the shaft between the receiving head and the mouth.

The receiving head including the corner portion may be shaped so that the longitudinal axes of the axle shaft is set at an angle θ (theta) to the longitudinal axes of the short bore. The angle θ (theta) may be determined by the algorithm 180-360/n, wherein n equals the number of peripheral rollers lying in a single plane on the continuous ring.

The die may include an additional cylindrical cavity for forming the mouth devoid of longitudinal separation lines thereon.

BRIEF DESCRIPTION OF THE DRAWINGS

The invention may be better understood from the following non-limiting description of preferred embodiments, in which:

FIGS. 1j-1p are various views of a peripheral axle according to another embodiment;

FIGS. 1q-1w are various views of a peripheral axle according to yet another embodiment;

FIGS. 3a-3d are various views of a roller;

FIGS. 6a-6d are various partially transparent views of the wheel shown in FIGS. 5a-5d;

DETAILED DESCRIPTION OF THE INVENTION

Figure 1A:
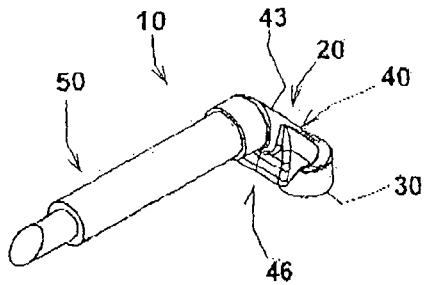
FIGS. 1a-1i are various views of a peripheral axle according to one embodiment.
Figure 1B:
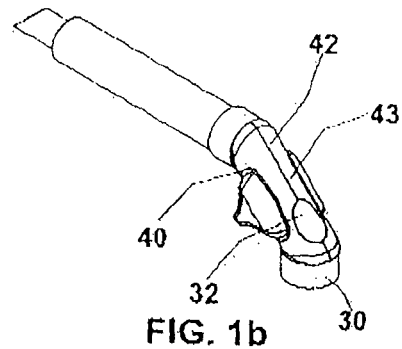
Figure 1C:
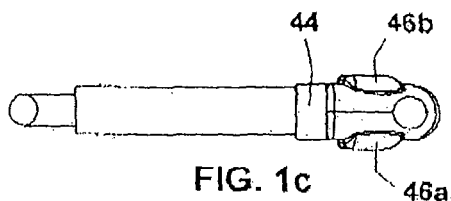
Figure 1F:
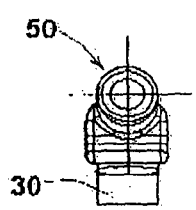
Figure 1D:
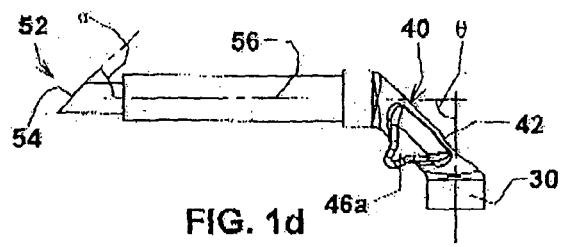
Figure 1G:
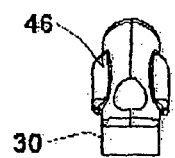
Figure 1E:
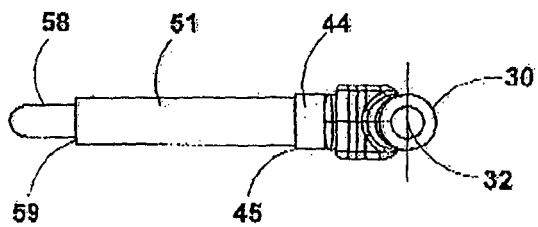
Figure 1H:
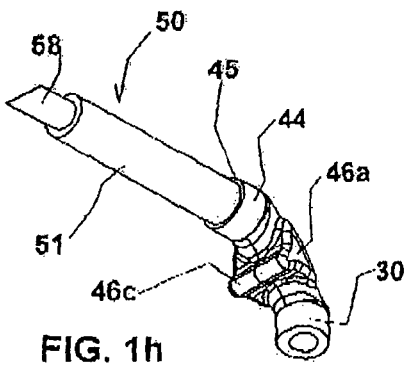
Figure 1I:
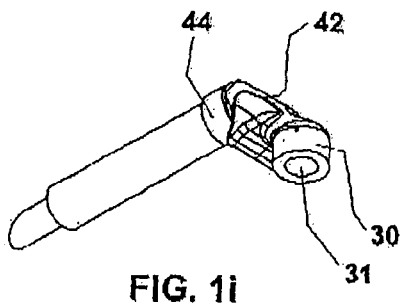
Figure 1J:
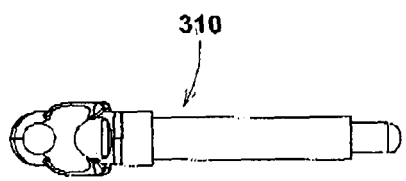
Figure 1N:
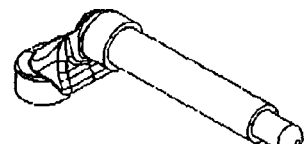
Figure 1K:
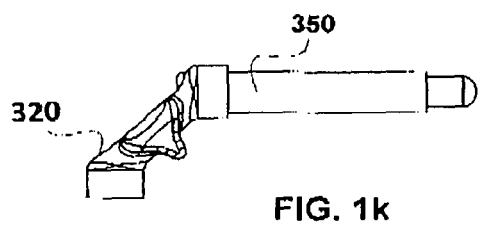
Figure 1L:
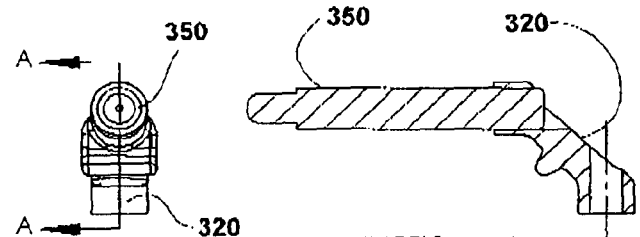
Figure 1L:
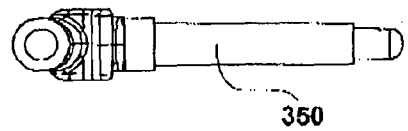
Figure 1P:
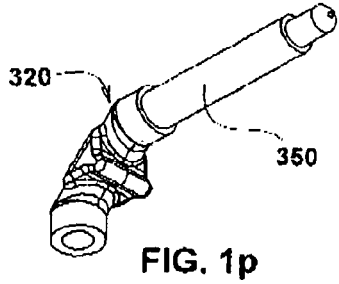
Figure 1Q:
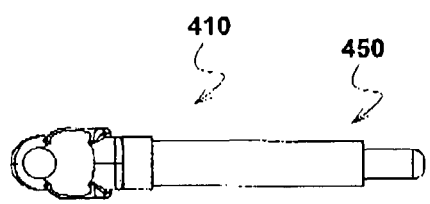
Figure 1U:
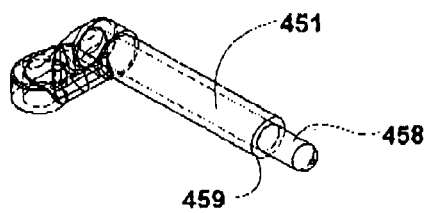
Figure 1R:
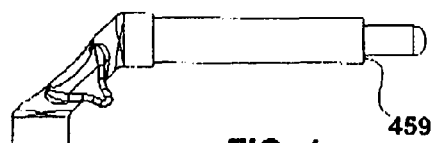
Figure 1T:
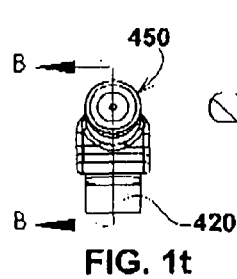
Figure 1S:
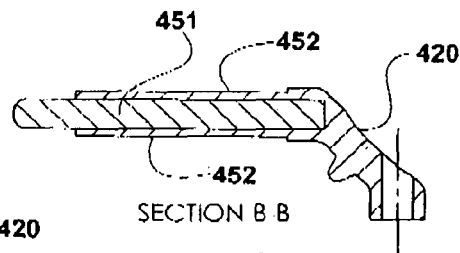
Figure 1S:
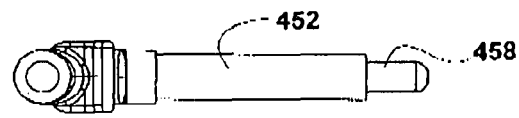

Preferred features of the present invention will now be described with particular reference to the accompanying drawings. However, it is to be understood that the features illustrated in and described with reference to the drawings are not to be construed as limiting on the scope of the invention.

Referring to FIGS. 1a to 1i, there is shown a peripheral axle 10 comprising a head 20 and an axle shaft 50. The peripheral axle 10 shown is one of four peripheral axles 10 shaped to form a continuous ring 80 (see below) with three other like peripheral axles 10. However, the skilled person will appreciate that the continuous ring 80 may be configured to comprise a lesser or greater number of peripheral axles, for example between three and ten axles making up the continuous ring of a wheel (see below). In each case, the peripheral axle 10 components may be identical, having a male end (the axle shaft 50) and a female end (the head 20), so that each peripheral axle 10 mar mate with a like, adjacent peripheral axle 10 to form a continuous ring 80 comprising between three and eight peripheral axles 10.

The head 20 includes a mouth 30 and corner portion 40.

The mouth 30 is a short cylinder defining a bore 32. The bore 32 may be cup-shaped and may terminate in the corner body 42 of the corner 40. However, preferably, the bore 32 may be a through-bore extending fully through to the rear of the corner body 42. The bore 32 internal walls may be keyed with longitudinal surface features that cooperate with corresponding features on the axle shaft 50 to mitigate against rotation of the axle shaft 50 in the bore 32, but preferably the bore 32 and the corresponding axle shaft are round in cross-section.

The corner portion 40 sets the angle θ (theta) at which the cylindrical axis of the bore 32 is set relative to the longitudinal axis of the axle shaft 50. Based on the formula 180-360/n, where n equals the number of peripheral axles 10 lying in a single plane on the continuous ring 80, the corner angle θ (theta) for a head of a four-axled embodiment is about 90°.

The corner portion 40 further comprises a generally cylindrical body 42 extending between the mouth 30 and an annular shoulder 44 aligned coaxially with the axle shaft 50. The corner body 42 includes surface features in the form of a spur 46 having two lateral triangular projections extending either side of the corner body 42, and bridged to each other in the elbow of the corner body 42.

The surface features may also be in the form of ridges, knobs, other protrusions or grooves that increase the surface area of the corner body 32. This increases the strength of the joint between the peripheral axle 10 and an over-molded wheel body 100 as will be described below. The spur's 46 lateral projections 46a,b extending in opposed lateral directions, and the elbow bridge 46c extending inwardly toward a main axis of the wheel (see below), provide structures in three different directions for optimum rigidity and strength in the over-molded joint between the peripheral axle 10 and the wheel body 100.

Coaxial with the annular shoulder 44 is the axle shaft 50. The axle shaft 50 comprises an elongate, uniformly cylindrical axle 52 stepped down in diameter relative to the shoulder 44, so that the shoulder 44 provides an annular retaining wall 45 for trapping one end of a roller 140 (see below).

It will be appreciated by the skilled person that in molding an axle shaft 50 or mouth 30 structure so that the structures are accurately round at any cross-sectional slice along their lengths, structures of either a conical or cylindrical shape may be utilized within the scope of this invention. The axle shaft 50 may be marginally truncated conical in shape, as may the mouth 30 and its bore 32. The conical shape may be useful to achieve length limiters that restrict the axial movement of the axle 50 relative to a roller 120, or the axle 50 relative to the bore 32. However, in the preferred arrangement shown, the structures are 50, 30 are shown as cylindrical.

The axle shaft 50 may be of consistent cross-section throughout its length and may be in the form of a cylinder. However, preferably the terminal end 52 of the axle shaft 50 terminates in an angled wall 54 having a plane lying at an angle α (alpha) to the longitudinal axis 56 of the axle shaft 50. The greater the number of rollers 120 (see below) in a single wheel plane, and the greater the corresponding number of corner portions 40, the larger the angle θ (theta). The angle α (alpha) is inversely proportional to the angle θ (theta). For a four roller wheel, the angle α (alpha) is 90°.

Furthermore, the terminal end 52 may have a step down terminal portion 58 connected to the main cylinder 52 by an annular step 59. The terminal portion 58 is shaped and configured for insertion in the mouth bore 32, so that the angled wall 54 extends to the outer wall 43 of the corner body 42. The angled wall 54 preferably does not extend beyond the outer wall 43, but may be flush therewith.

The axle shaft 50 is of a sufficient thickness to provide a structurally rigid and strong axle along its length. For example, in the embodiment shown in FIG. 1a-1i, the axle 50 diameter may be 3.8 mm for a 48 mm sized wheel 160, although the axle 50 diameter may vary depending on the application and wheel 160 size. The mouth 30 wall may be sufficiently thick for joint strength with the terminal portion 58, as well as to provide a step (in the form of mouth face 31) from the axle 50 to the mouth 30 outer wall. The spur 46 adds mass to the corner or bridge portion 20 and to increase the surface area for over-mold adhesion with the wheel. body 100.

The axle shaft 50 may be solid or hollow in structure. The axle shaft 50 for heavy load applications is a composite structure having a metal rod extending centrally and longitudinally along a substantial proportion of its length to provide a central and longitudinal reinforcing beam. Alternatively, the axle shaft 50 may be wholly made of metal or wholly made of plastic.

Referring to FIGS. 1j-1p, there is shown an alternative embodiment of a peripheral axle 310. The peripheral axle 310 comprises a steel axle shaft 350 and a plastic over-molded head 320, but is otherwise of the same shape and configuration as the peripheral axle 10. Referring to FIGS. 1q-1w, there is shown an alternative peripheral axle 410 comprising a composite or steel and plastic over-molded materials, wherein the axle shaft 450 includes an inner steel core rod or pin 451 and a plastic over-molded sleeve 452. The steel core rod 451 is continuous with a terminal portion 458 and the outer extent of the plastic over-molded sleeve 452 forms an annular step 459. As best seen in FIG. 1w, the plastic over-molded sleeve 452 is contiguous with the head 420. The head 420 is formed with plastic material integrally formed with the plastic over-molded sleeve 452.

Figures 2A, 2B, 2C:
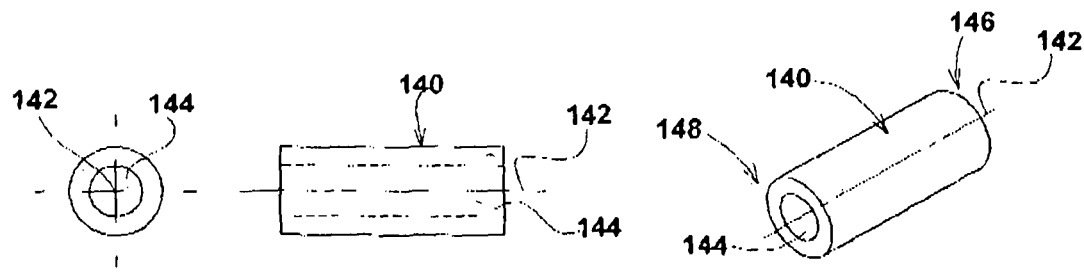
FIGS. 2a-2c are various views of a bush according to one embodiment.
Figures 2D, 2E, 2F:
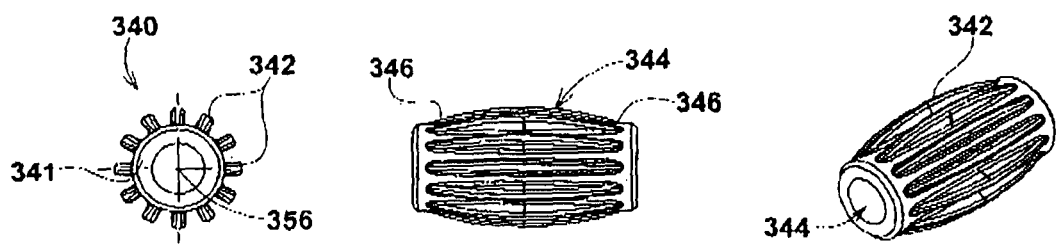
FIGS. 2d-2f are various views of a bush according to another embodiment.
Figures 2G, 2H, 2I:
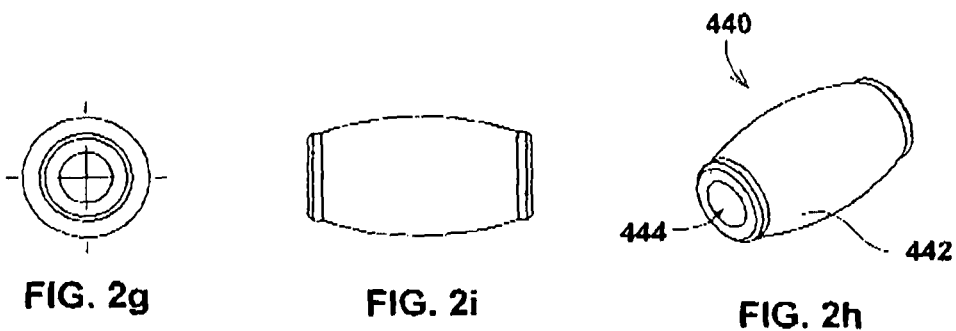
FIGS. 2g-2i are various views of a bush according to another embodiment.

Referring to FIGS. 2a to 2c, there is shown a bush 140 in the form of a hollow cylinder having a longitudinal axis 142 arid defining an internal cylindrical bore 144 shaped and configured to receive the axle shaft 50. The internal cylindrical bore 144 is preferably shaped and configured to receive the main cylinder 52. The bush 140 may be mounted on the main cylinder 52 between the annular step 59 and the annular retaining wall 45.

A first bush end 146 may abut, be flush with, or lie close to or in the same plane, as the annular retaining wall 45 and the other bush end 148 may be flush with, or lie close to, or in the same plane as, the annular step 59.

Instead of the bushing 140, there is shown in FIGS. 2j-2l an alternative bushing 340 comprising a plurality (in this case twelve) of longitudinal ribs 342. The longitudinal ribs 342 are arced along their length, whereby their respective mid sections 344 are radially spaced further away from the longitudinal axis 356 than the ridges' 342 respective ends 346. The longitudinal ridges 342 therefore form solid arcs extending longitudinally along the external surface of the bushing 340, whereby the bushing 340 generally has a longitudinally ribbed cigar shape that may correspond to the general cigar shape of roller tyres to be over-molded thereon. The longitudinal ridges 342 are preferably integrally formed with the main body or core 341 of the bushing 340.

Turning to FIGS. 2m-2o, yet another alternative bushing embodiment is shown in the form of barrel-shaped bushing 440. The internal bore 344, 444 is cylindrical in order to conform to the general cylindrical shape of the axle shaft 50. However, the external surface 442 of the barrel-shaped bushing 440 is, indeed, cigar- or barrel-shaped in order to correspond to the generally cigar- or barrel-shaped rollers 120 that may be molded thereon. The provision of a cigar-shaped bushing 440, made of necessarily hardened plastic, relative to the softer elastomeric plastics of which the tyre is made, may serve to strengthen the overall roller 120 construction, save on elastomeric material and give greater strength to the roller 120 throughout its length relative to a straight cylindrical bushing 140. The arced curvature of the bushing 440 represents a stronger structure with regard to lateral forces to which a roller 120 may be subjected to transverse to the longitudinal roller axis 142, compared to the straight cylindrical bush 140.

Referring to FIGS. 3a to 3d, preferably the bush 140 is retained within a cylindrical cavity 122 in the roller 120. The roller 120 includes a pair of opposed openings at each end 124 that are coaxial with the cylindrical cavity 122. The bush 140 has a smaller internal diameter and a larger outer diameter than the openings 124. The roller tyre 126 may be over-molded on the bush 140 as will be described below.

Figure 20:
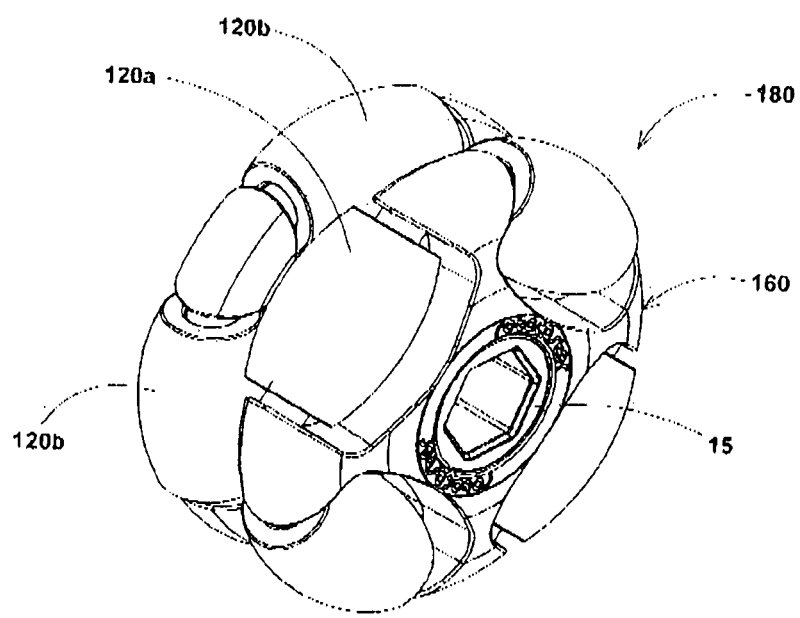
FIG. 20 is a perspective view of a completed twin wheel made according to an aspect of the invention.

The roller 120 is a bi-truncated fusiform, barrel or cigar shaped. The thickness of the roller tyre 126 at its respective ends as indicated by reference no. 128 is critical for a number of reasons. The end portion 128 of the roller 120 must be sufficiently thick to preclude failure through normal wear and tear as the stresses and potential for failure are greatest at the end portion 128. However, the thicker the end portion 128 is, the more difficult it is to achieve significant overlap between diagonally adjacent rollers in a wheel such as the twin wheel 180 shown in FIG. 20. This is because the more elongate bi-truncated fusiform shape better accommodates greater overlap between diagonally adjacent rollers 120a,b, but a finely tapered end portion 128 will make the roller 120 less robust and likely to smoothly rotate, and more prone to failure and less resilient to normal wear and tear.

The dimensions of wheel 160 and the rollers 120 may vary for different applications. The radius of curvature of the rollers 120, when viewed in side elevation, generally will follow the radius of curvature of the wheel periphery. Larger wheels will have rollers having a larger radius of curvature. The number of rollers per frame may be determined according to criteria such as the relative strength of component materials and structures and the capacity of individual rollers to bear the load transferred through the main axle 15. High load wheels will require barrel-shaped, proportionally shorter rollers having thicker roller tyres to withstand the large forces, particularly those borne at the remote ends of the rollers when in ground contact. Lighter load applications may utilize cigar-shaped, more-elongate and small diameter rollers that may be employed to reduce production and raw material costs.

Figure 4A:
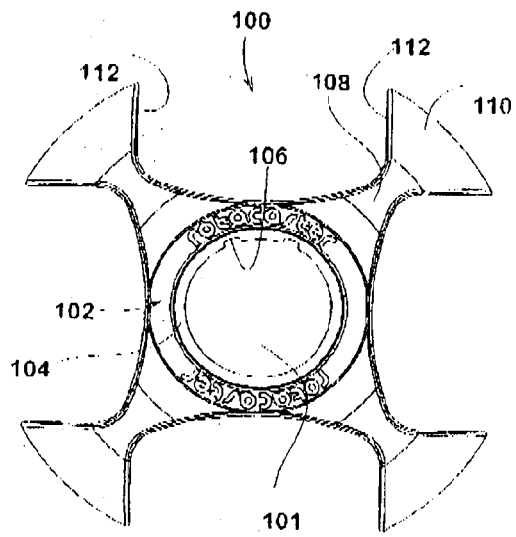
FIGS. 4a-4f are various views of a wheel body.
Figure 4C:
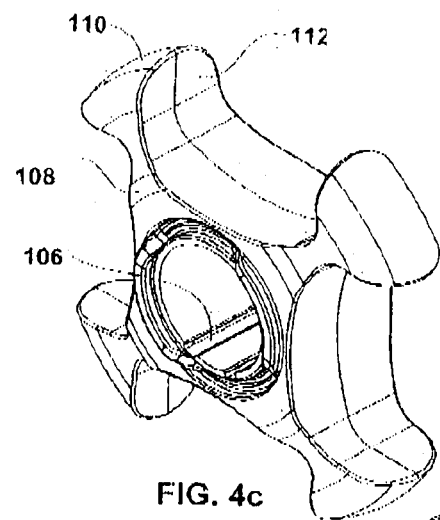

In FIGS. 4a-4f there is shown the wheel body 100 as it would be shaped without the intersecting peripheral axles 10. The wheel body 100 comprises a central hub 102 journaled for rotation about a main bearing 104 that is keyed by longitudinal slot 106 for mounting on a main axle 15 (see FIG. 20). The wheel body 100 further includes a plurality of outwardly extending arms 108. The arms preferably extend radially. The arms 108 terminate in support heads 110 that are, in side elevation as shown in FIG. 4a, substantially triangular in shape. Adjacent supports 110 present opposed substantially parallel planar faces 112 between which extend the axle shaft 50 when the wheel 160 is assembled. In the embodiment shown, the wheel body 100 is shaped to accommodate four rollers 120, thereby comprising four radial arms 108.

Figure 4B:
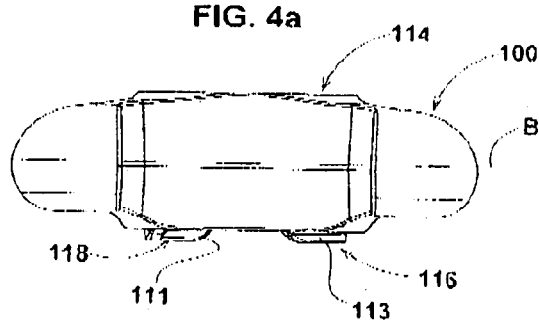
Figure 4D:
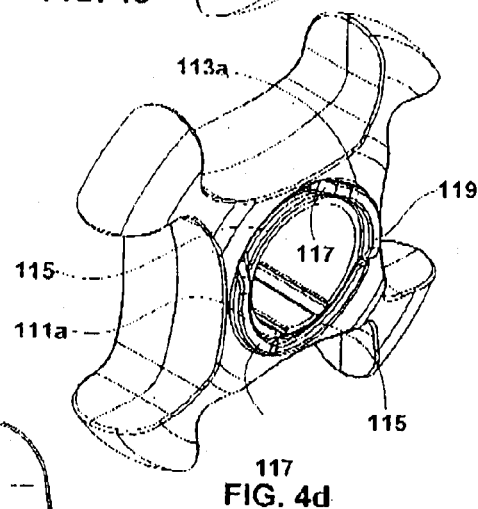

The wheel body 100 may be bi-symmetrical through a plane B as shown in FIG. 4b. More preferably, the wheel body 100 includes an outer rim 114 and an inner rim 116. The inner rim 116 includes locking elements 118 comprising a pair of raised arc tracks 111, 113 that include complementary grooves and ridges adapted to lockably engage each other when like wheel bodies 100 are abutted with their respected inner rims 116 facing each other. The respective wheel bodies 100 are positioned so that the raised arc locking elements 111, 113 are positioned in arc gaps 115 and rotated 90° so that the respective locking elements 111, 113 engage.

In another embodiment, the locking elements 111, 113 are identical in shape and configuration, but rotated 180° relative to each other. The locking element 111a, 113a shown in FIG. 4d include a receding ramp 117 including a trapped groove into which corresponding lead projections 119 enter to positively engage the respective wheel bodies 100. The respective wheel bodies 100 may be further chemically or mechanically bonded by subjecting the combined twin wheel body 180 to, for example, ultrasonic welding to provide a strong bond between the respective surfaces of the facing inner rims 116 so that they are locked in non-reversible engagement.

Figure 4E:
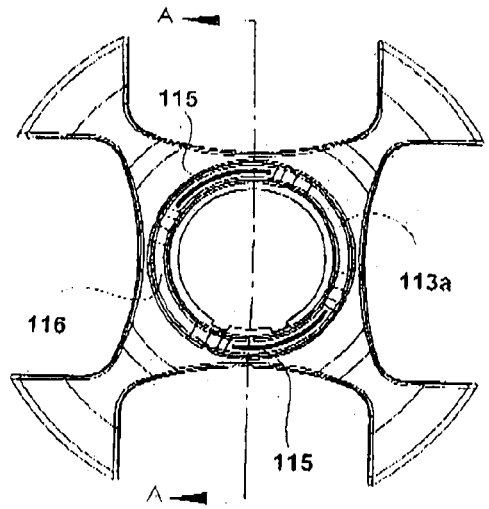
Figure 4F:
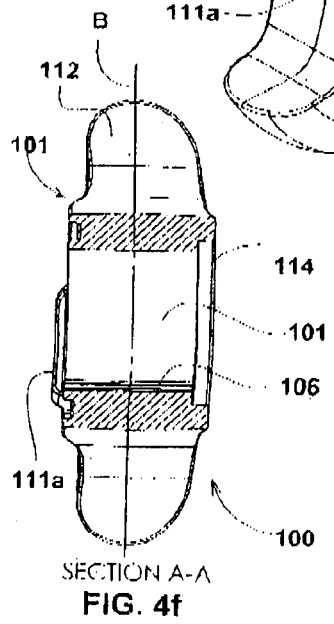
Figure 5A:
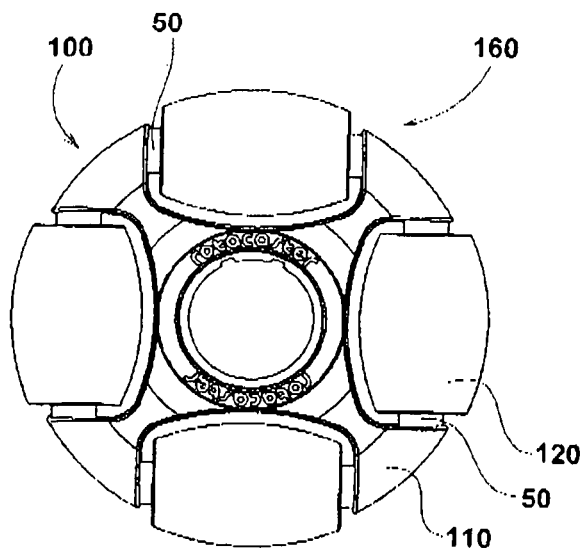
FIGS. 5a-5d are various views of a wheel.
Figure 5B:
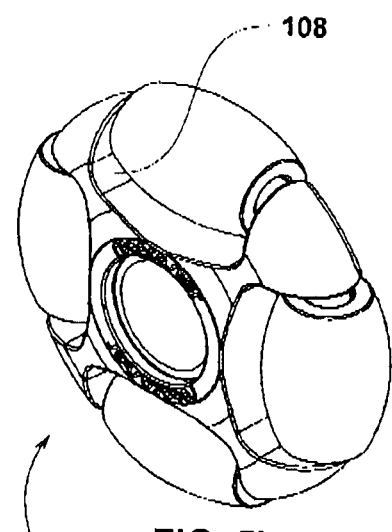
Figure 5C:
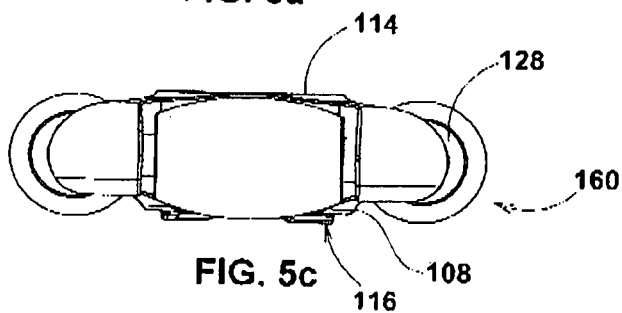
Figure 5D:
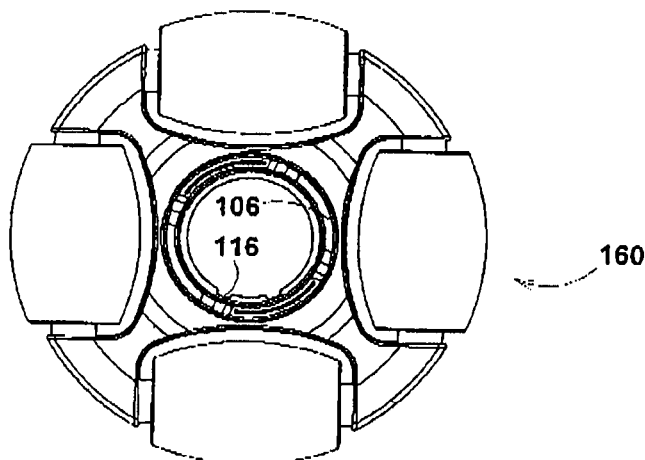

As shown in FIG. 4f, the support ends 110 are slightly biased toward the inner side 101 of the wheel body 100 when viewed in transverse section along line A-A of FIG. 4e.

In FIGS. 5a-5d, a completed wheel 160 is shown with the wheel body 100 over-molded onto the peripheral axles 10.

In FIGS. 6a-6d, the internal detail of the over-molded connection between the peripheral axles 10 and the supports 108 are shown in greater detail. It can be seen that the spurs 46 provide rigid internal structures around which the over-molded support 108 strongly contacts over a large surface area to ensure a strong and rigid connect between the peripheral axles 10 and the support 108. It can also be seen that the wheel body 100 is shaped and configured to provide a cradle or recess 105 within which the roller 120 is suspended by its mounting to the peripheral axle 10.

Figure 7A:
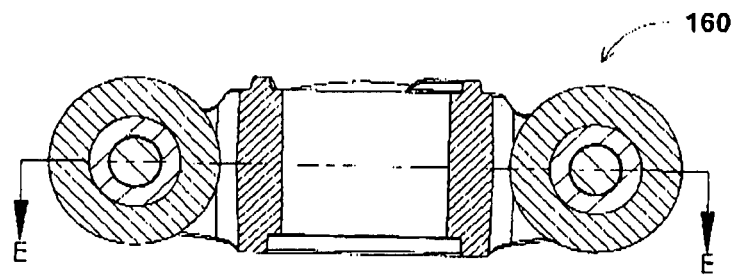
FIGS. 7a and 7b are sectional views of the wheel shown in FIGS. 5a-5d.
Figure 7B:
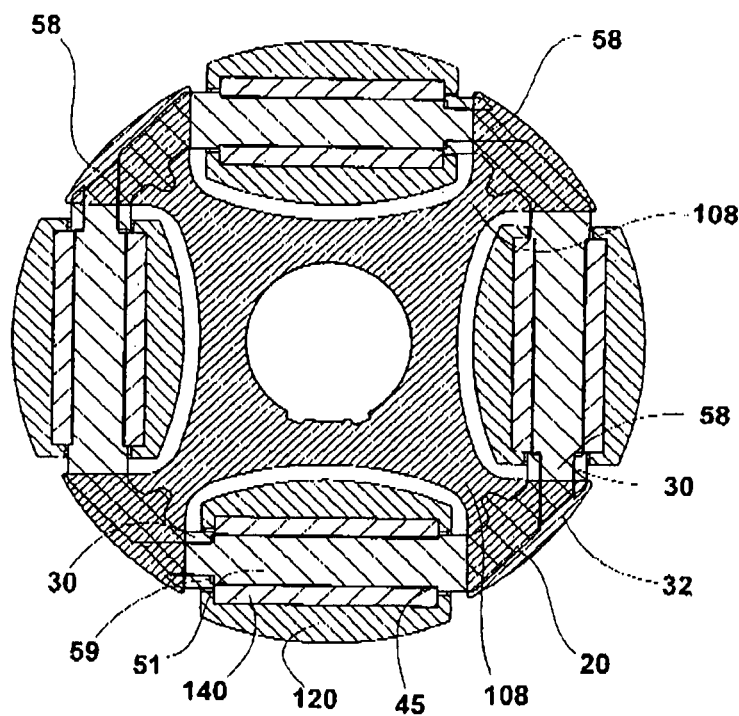

In FIGS. 7a and 7b, sectioned views of the wheel 160 show the relationship between the over-molding of the support 108 and the terminal end 58 of the peripheral axle 10, together with the mouth bore 32. The terminal end 58 terminates just short of lying flush with the outer opening of the mouth bore 32, so that mold material of the support 108 penetrates into the mouth bore 32, strongly connecting with the peripheral axle 10, both at the head 20 and the peripheral end 58. Also indicated is the relationship between the axle shall 50, the annular retaining wall 45 and the bush 140, stepped wall 59 and the mouth 30. It can be seen that the annular retaining wall 45 and mouth facing wall 31 are inserted into the openings 124 and abut the ends 146, 148 of the bush 140, so that the roller 120 is trapped for rotation within the recess 105 and able to freely rotate about the axle shaft 51.

Figure 8:
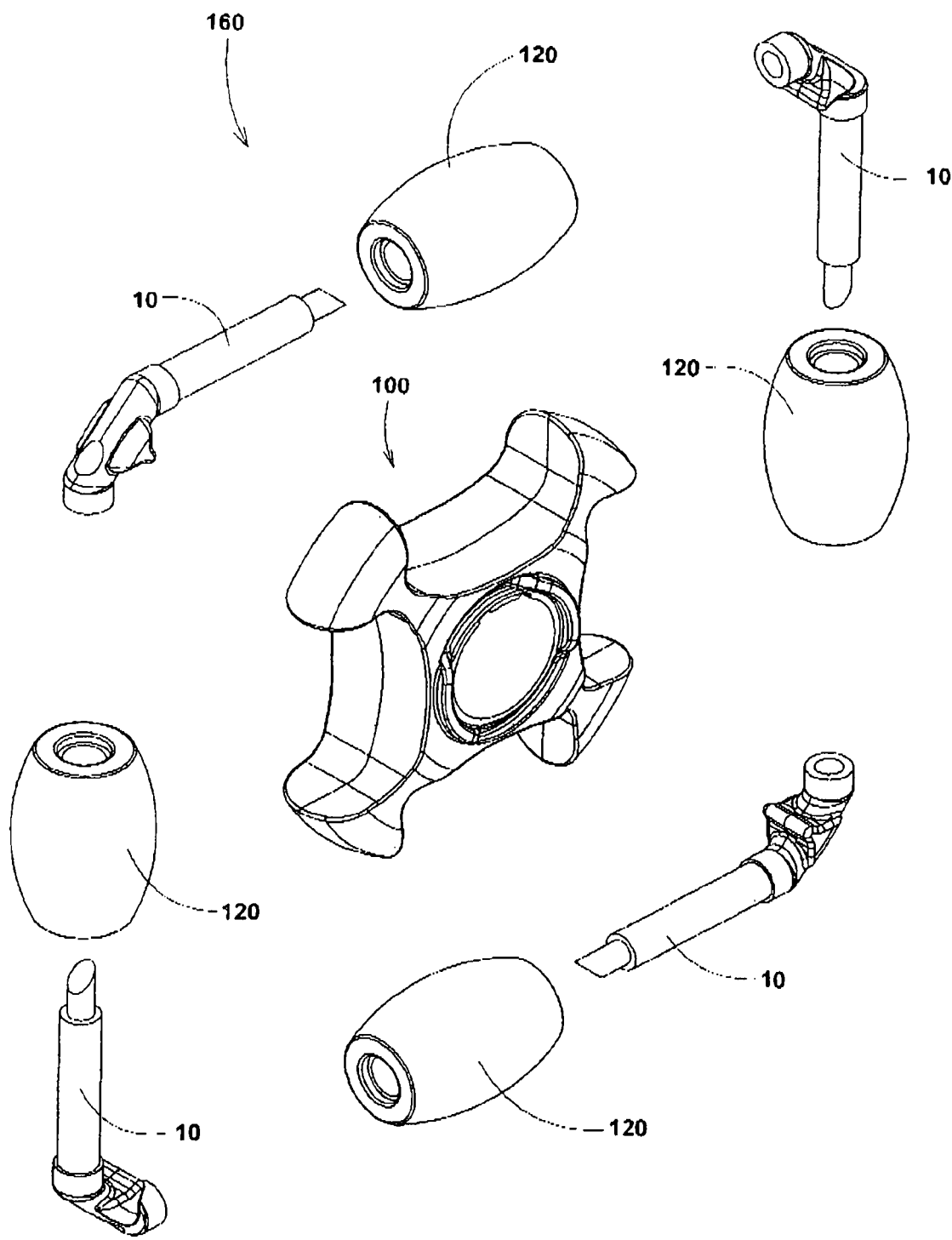
FIG. 8 is an exploded view of the wheel shown in FIGS. 5a-5d, noting intersections between the peripheral axles and the wheel body supports are not shown.

In FIG. 8 there is shown the components of the wheel 160 in exploded view. The wheel 160 comprises the wheel body 100, four peripheral axles 10 and four rollers 120.

Figure 9A:
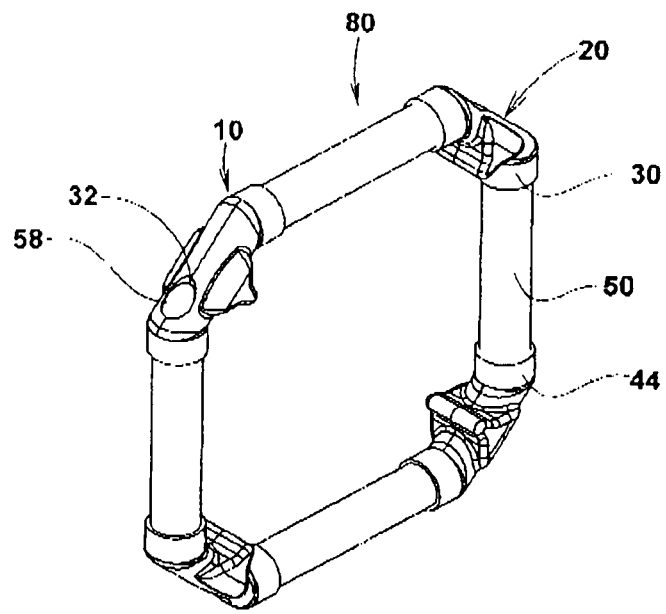
FIGS. 9a and 9b are perspective and ghosted views, respectively, of a continuous ring assembled without rollers.
Figure 9B:
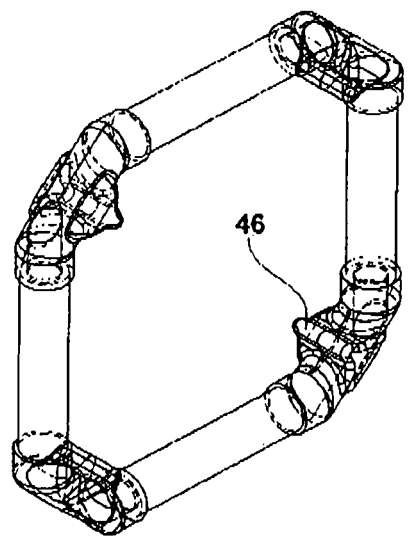

FIGS. 9a and 9b show how the peripheral axles 10 join together to form a continuous ring 80 by the joining of four identical peripheral axles 10 by the insertion of the axle shaft 50 of each peripheral axle 10 into a mouth 30 of an adjacent peripheral axle so that the terminal end 58 extends almost, but not fully, through the mouth bore 32. It is noted that the rollers 120 may be over-molded over the axle shafts 50, so that the continuous ring 80 may he formed before the rollers 120 are mounted to the continuous ring 80. However, it is preferred that the rollers 120 are first formed about a corresponding bush 140 and mounted onto the corresponding peripheral axle, while the terminal end 58 is free and unattached to an adjacent peripheral axle 10. In FIG. 9a, it can be seen that the annular shoulder 44 is integrally formed with the axle shaft 50.

Figure 10A:
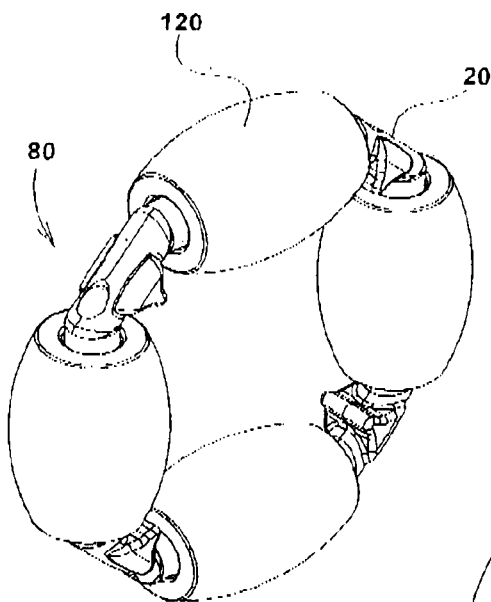
FIGS. 10a-10c are perspective and ghosted views of a continuous ring and rollers preassembly.
Figure 10C:
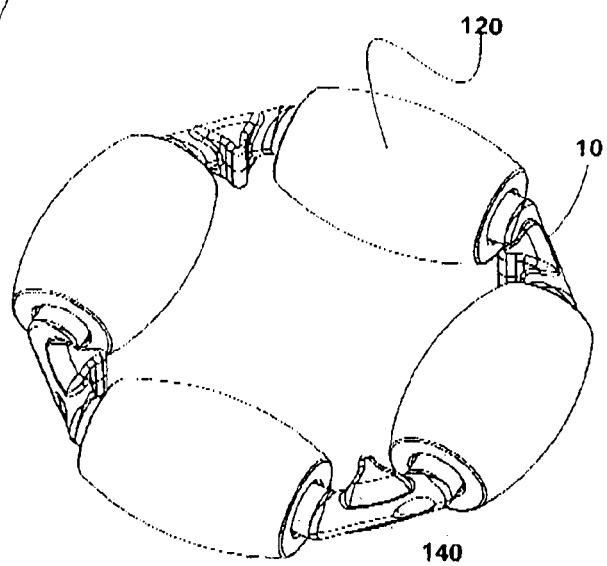
Figure 10B:
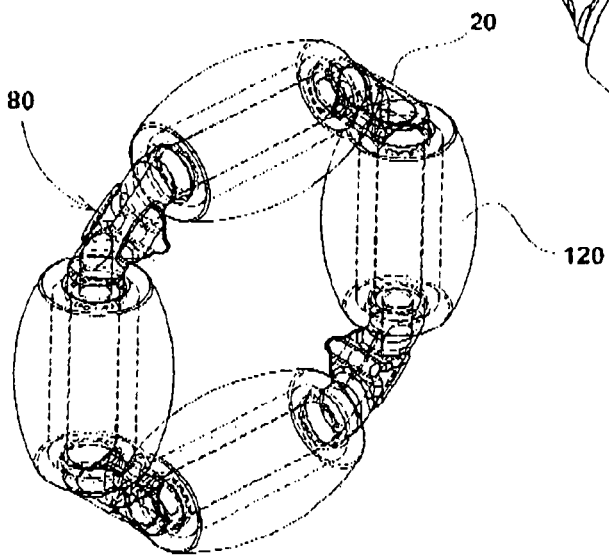

In FIGS. 10a-10c, the rollers 120 are shown assembled onto the continuous ring 80 preparatory to the wheel body 100 being over-molded onto the heads 20 of the preformed peripheral axles 10.

Figure 11A:
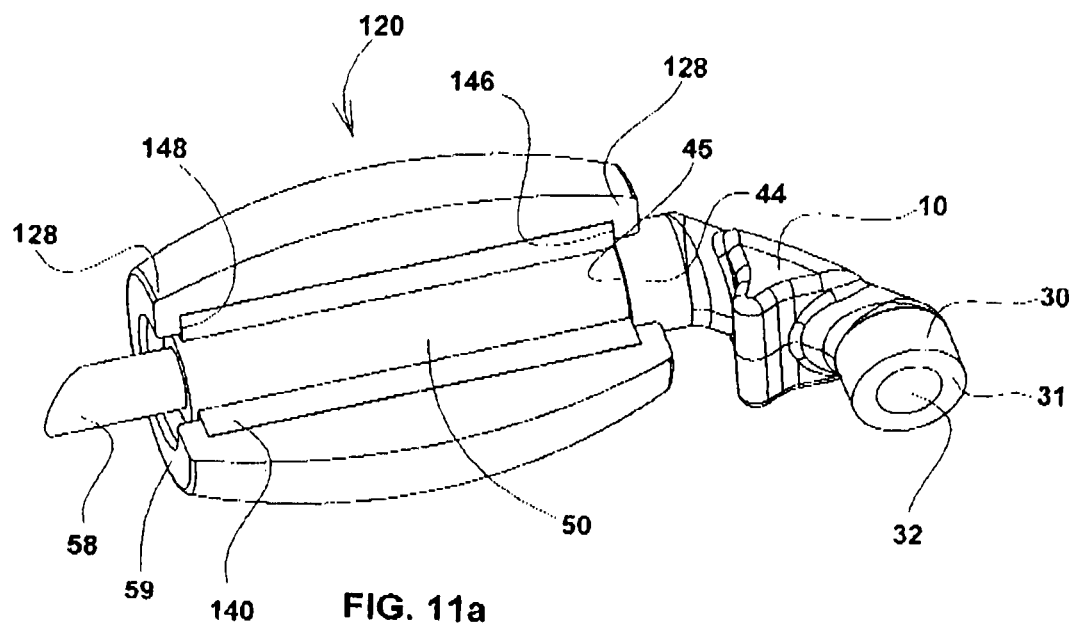
FIGS. 11a and 11b are cut-away and ghosted views, respectively, of a peripheral axle and roller preassembly.

In FIG. 11a, the formation of the roller 120 and peripheral axle 10 is shown. The peripheral axle 10 is separately molded, as is the bush 140. The roller tyre 126 is then molded over the bushing 140 to form a roller module comprising the roller tyre 126 and bushing 140. The roller module 120, 140 is then mounted onto the axle shaft 50 by insertion of the axle shaft 50 through either end of the roller module 120, 140. The roller module 120, 140 is mounted onto the axle shaft 50 so that either end 146, 148 of the bush 140 abuts the annular retaining wall 45. The opening 124 maybe of a marginally greater diameter than the annular shoulder 44 to minimize friction as the roller 120 rotates, although the gap between the end portions of the roller 128 and the annular shoulder 44 are minimal to reduce the effect of compressive forces applied to the end roller portions 128.

Figure 11B:
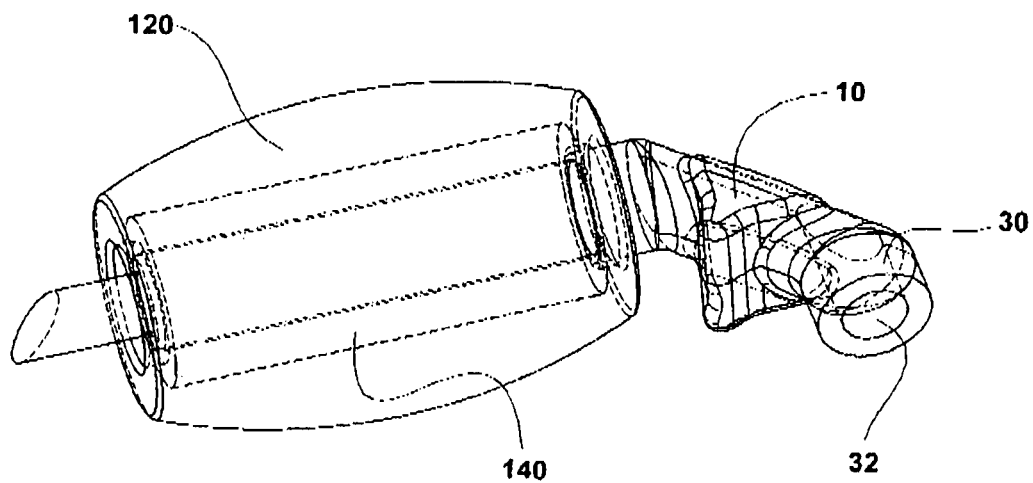

It will be appreciated that the external diameter of the mouth 30 is preferably identical to that of the annular shoulder 44, so that the insertion of the terminal end 58 in the mouth bore 32 until the mouth 30 open face 31 abuts the stepped wall 59, the end roller portion 128 partially extending over the mouth 30 as best seen in FIG. 7b. In FIG. 11b, the bushing 140 is shown mounted onto the peripheral axle 10. The peripheral axle 10 may be molded from high-strength plastic material, the bushing 140 from high-strength, low-friction plastic material and the roller tyre 126 from a high-strength and moderately high-friction polymer.

Figure 12:
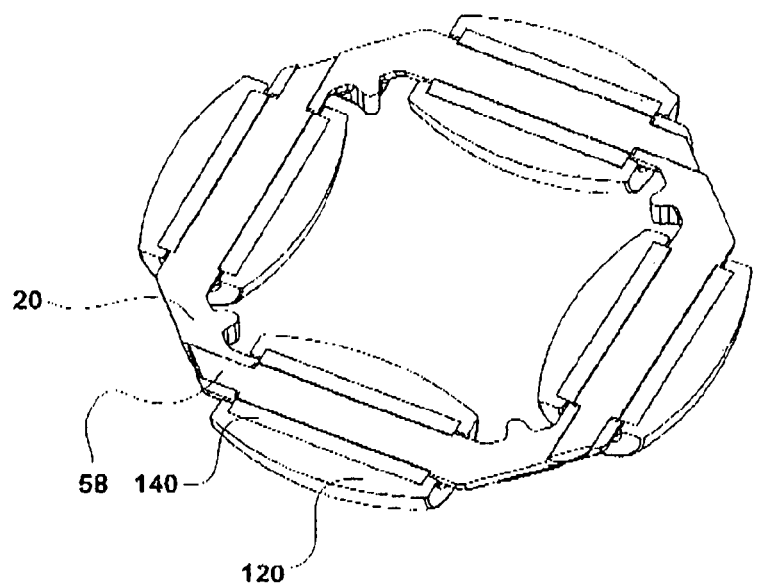
FIG. 12 is a cut-away sectional view of the peripheral axle and roller preassembly shown in FIGS. 10a-10c.
Figure 19:
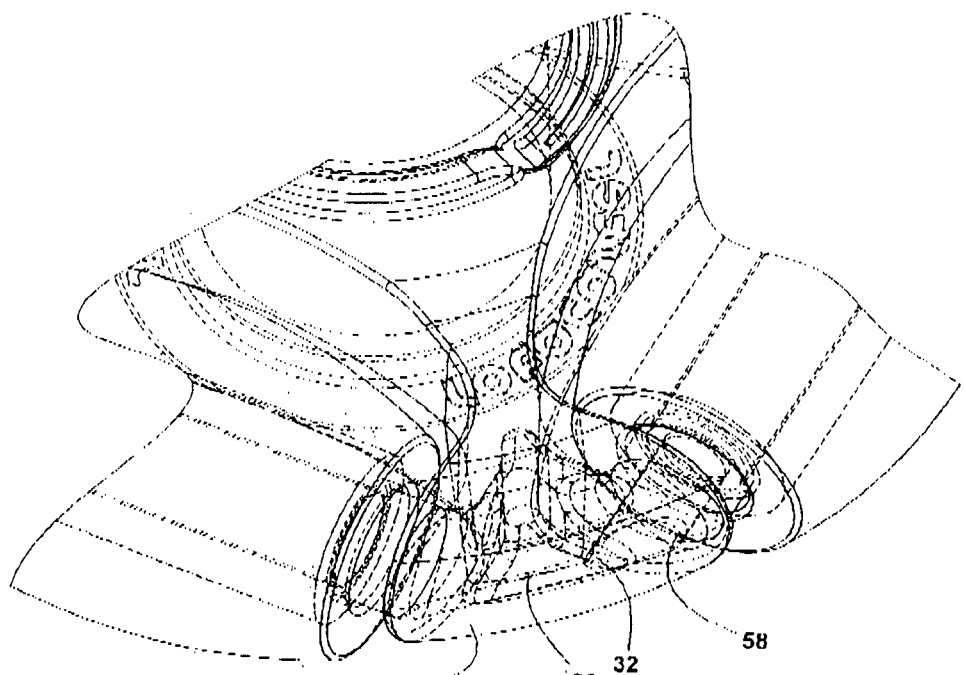
FIG. 19 is a perspective cut-away view of the joint between a peripheral axle head, adjacent peripheral axle shaft and wheel body support.

As with FIGS. 7b, 12 and 19 clearly demonstrate the configuration of the joint between the terminal end 58 and head 20, as well as the mounting of the roller 120 over the extruded plastic bushing 140.

Figure 13:
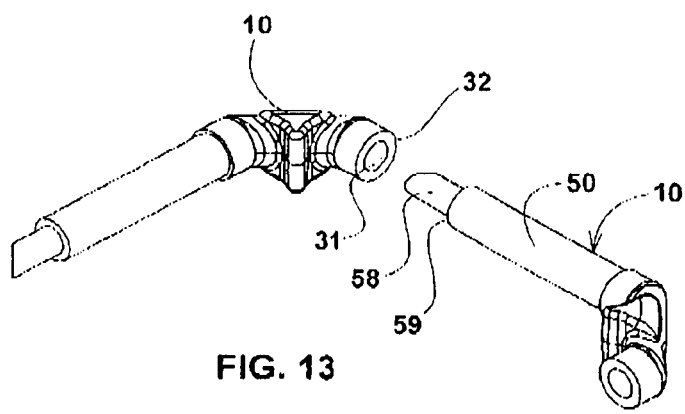
FIG. 13 is a perspective view of a peripheral axle and a head of an adjacent peripheral axle.
Figure 14:
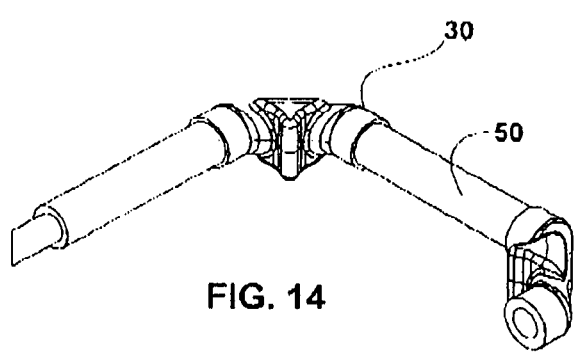
FIG. 14 is a perspective view or a pair of peripheral axles mated together without a roller.

FIGS. 13 and 14 demonstrate the insertion of the terminal portion 58 into the mouth bore 32 in a "line-to-line fit" that holds the adjacent peripheral axles 10 together. As shown in FIG. 14, the joining of the axle shaft 50 with the mouth 30 creates a second annular step formed by mouth face 31 abutted against the stepped wall 59, whereby the mouth face 31 and annular retaining wall 45 are effective to trap the roller bushing 140 on the axle shaft 50.

Figure 15:
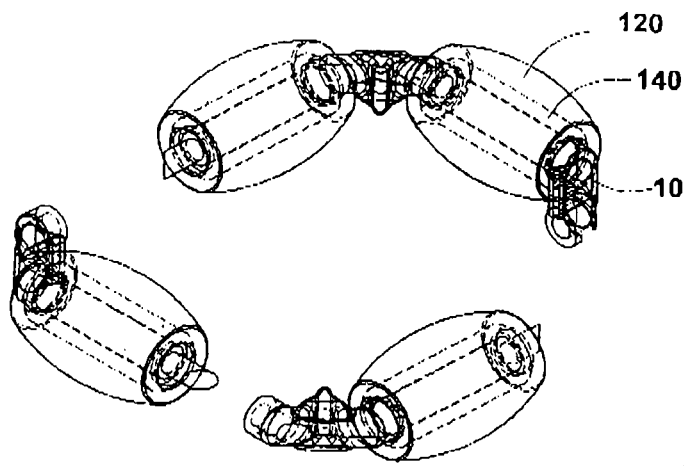
FIG. 15 is a ghosted perspective view of a pair of peripheral axles with mounted rollers and an unmated pair of peripheral axles with mounted rollers prior to complete assembly.

In FIG. 15, the step of joining pairs of sub assemblies of peripheral axle 10 and roller module 120, 140 combinations is shown, whereby pairs are formed that are then joined to form a continuous ring 80 on which n number of rollers are mounted.

Figure 16:
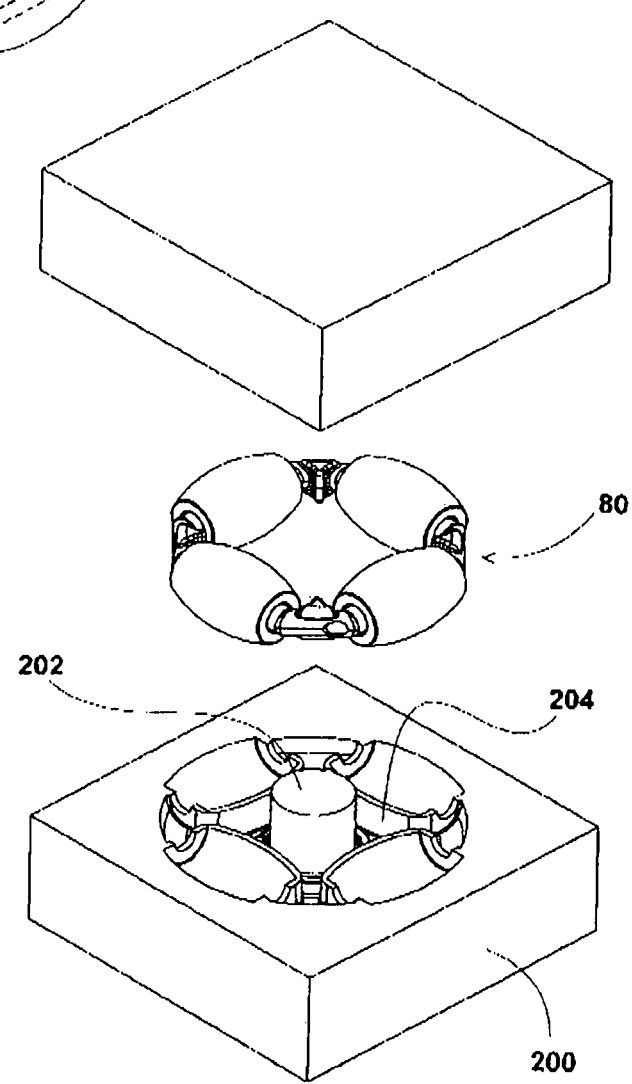
FIG. 16 is a perspective view of the peripheral axles and rollers shown in FIG. 15 assembled prior to insertion into a wheel body injection mold.
Figure 17:
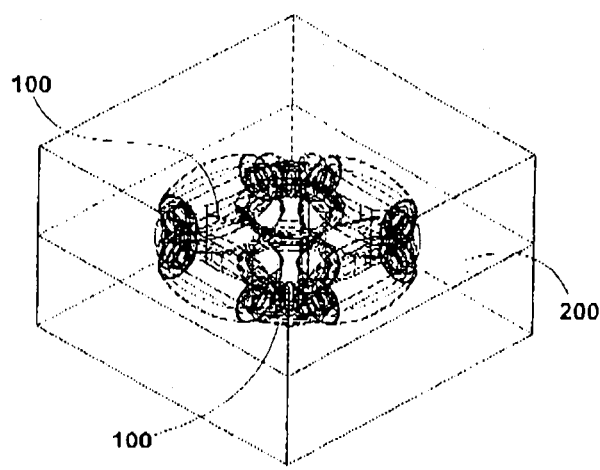
FIG. 17 is a perspective ghosted view of the assembled wheel completed in an injection mold.

FIG. 16 shows the assembled pairs of subassemblies joined to form a continuous ring 80 prior to it being inserted into a wheel body 100 injection mold 200, whereby the continuous ring 80 and rollers 120 are nestled into the mold 200, which is then shut as shown in FIG. 17 to lock the continuous ring 80 and rollers 120 in place. Shut offs in the mold 200 secure the continuous ring 80 for molding and then the wheel body 100 is injected over the continuous ring 80.

Figure 18:
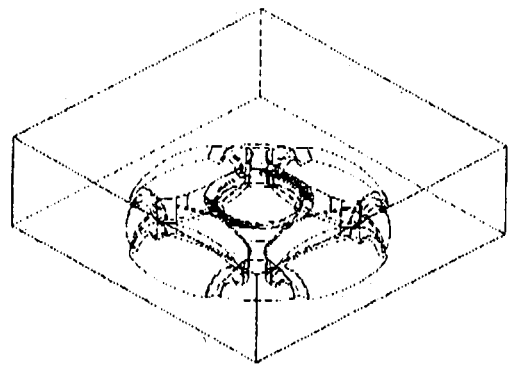
FIG. 18 is a perspective view of the completed wheel after removal from an injection mold.
Figure 18:
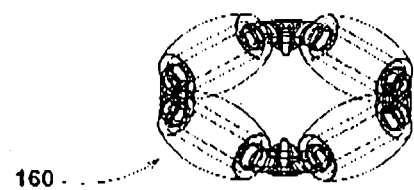
Figure 18:
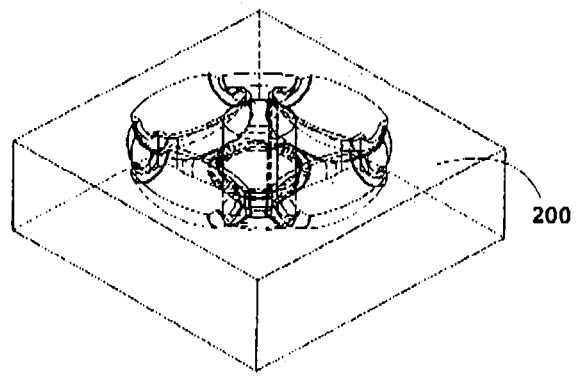

The dye or mold 200 includes a central insert 202 that defines the cavity corresponding to the main axle bore 101 shown in FIG. 4a and FIG. 4f The insert 202 also includes a longitudinal ridge 204 that forms the keyed slot 106. As shown in FIG. 18, the completed wheel 160 may then be removed from the mold 200.

As shown in FIG. 19, the terminal portion 58 extends through the mouth bore 32, but leaves a small area adjacent to the outer opening of the mouth bore 32 to permit the overmolded wheel body 100 in the area of the support heads 110 to penetrate and mold into and around the mouth bore 32 to increase the adhesion of the wheel body 100 to the peripheral axle 10 and more particularly the head 20.

A pair of completed wheels 160 are shown as a pair of wheels joined to form a twin wheel 180 mounted to a main axle 15 having a hex cross-sectional bore. The twin wheel 180 is useful as an omni-directional or multi-directional wheel and may be used as a substitute, for example, in place of castor wheels.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, with the context indicating which component is uppermost.

It will be appreciated by those skilled in the art that many modifications and variations may be made to the methods of the invention described herein without departing from the spirit and scope of the invention.

The invention claimed is:

1. A peripheral axle adapted tangentially about a wheel rotatable about a main axis and radially spaced from the main axis, the wheel having a plurality of peripheral rollers mounted on a plurality of peripheral axles, the peripheral axle comprising:
    an axle shaft; and
    a head portion comprising a corner portion setting an angle for the head portion relative to the axle shaft, the head portion adapted to engage an axle shaft of an adjacent peripheral axle of the plurality of peripheral axles, wherein the head portion of the peripheral axle is separately formed apart from a head portion of the adjacent peripheral axle,
    wherein said peripheral axle is adapted to form a continuous axle ring with the plurality of peripheral axles.

2. The peripheral axle of claim 1, wherein said peripheral axle comprises no mold parting lines extending longitudinally along the axle shaft.

3. The peripheral axle of claim 1, wherein all or part of the length of the axle shaft is cylindrical in shape.

4. The peripheral axle of claim 3, wherein a mold separation line extends laterally on said axle shaft, not longitudinally.

5. The peripheral axle of claim 3, wherein the head portion is sized and configured to receive a free end of an axle shaft of an adjacent peripheral axle of the plurality peripheral axles in the continuous axle ring.

6. The peripheral axle of claim 5, wherein said head portion defines a short bore to receive said free end.

7. The peripheral axle of claim 6, wherein the respective axes of said short bore of the head portion of said peripheral axle and the axle shaft of the adjacent peripheral axle of the plurality of peripheral axles are coaxial.

8. The peripheral axle of claim 6, wherein the respective axes of the short bore of the head portion of the peripheral axle and the axle shaft are set at an angle theta determined by the algorithm 180-360/n, where n equals the number of peripheral rollers lying in a single plane on said continuous ring.

9. The peripheral axle of claim 6, wherein the short bore is defined in a cylindrical body of the head portion extending between a mouth to receive the free end and a shoulder aligned coaxially with the axle shaft.

10. The peripheral axle of claim 9, wherein the axle shaft comprises an elongate, uniformly cylindrical axle stepped down in diameter relative to the shoulder.

11. The peripheral axle of claim 10, wherein the shoulder is an annular shoulder and is adapted to provide an annular retaining wall for trapping one end of one roller of the plurality of rollers.

12. The peripheral axle of claim 11, wherein a bush is retained on the axle shaft by the mouth, and by a step defined by the shoulder.

13. The peripheral axle of claim 12, wherein the bush is mounted on the axle shaft as a sleeve and inserted into a central longitudinal bore in one of the plurality of peripheral rollers.

14. The peripheral axle of claim 13, wherein one end of the one of the plurality of peripheral rollers has an opening that at least partially receives the shoulder.

15. The peripheral axle of claim 14, wherein the opening is marginally greater in diameter than the shoulder to minimize friction as the peripheral roller rotates.

16. The peripheral axle of claim 6, wherein the corner portion includes two projections extending either side of the corner portion that are bridged to each other in an elbow of the corner portion.

17. The peripheral axle of claim 1, wherein the peripheral axle is configured to be identical to each peripheral axle of the plurality of peripheral axles.

18. A wheel comprising:
    a plurality of peripheral axles forming a continuous axle ring, each comprising the peripheral axle of claim 1; and
    a wheel body comprising:
        a hub defining a main axle bore rotatable about the main axis; and
        a plurality of supports on or in which said head portions are mounted and extending outwardly from the hub.

19. The wheel of claim 18, wherein said wheel body is separately formed apart from the plurality of peripheral axles and molded over the head portions of each of the plurality of peripheral axles.

20. The wheel of claim 18, wherein the wheel body includes a central hub to be rotatably mounted on a main axle of the wheel.

21. The wheel of claim 18, wherein the supports include an outwardly extending arm that supports the head portion in spaced relationship to the main axis.

22. The wheel of claim 18, wherein the corner portion includes a protrusion that strengthens the joint between the head portion and the wheel body.

23. The wheel of claim 22, wherein the protrusion comprises a pair of protrusions joined by a bridge.

24. The wheel of claim 18, wherein the head portion of the peripheral axel includes a mouth defining the short bore, the mouth forming an annular shoulder on the axle shaft to trap a corresponding roller of the plurality of peripheral rollers on the axle shaft between the head portion and the mouth.

25. The wheel of claim 24, wherein the mouth defines a cylindrical cavity with a mouth wall having no longitudinal separation lines thereon.

26. A method of assembling a wheel with a plurality of peripheral axles, each comprising the peripheral axle of claim 1, said method including the steps of:

molding each said peripheral axle in a die having a cylindrical cavity for forming the axle shaft of said peripheral axle without longitudinal separation lines, said peripheral axles each having one of said head portions for receiving a free end of said axle shaft of an adjacent other one of the peripheral axles;

mounting a roller on each said axle shaft;

joining said peripheral axles together to form a continuous ring of said peripheral axles; and molding a wheel body including a support structure around said continuous ring.

27. A peripheral axle forming part of a wheel rotatable about a main axis and having a plurality of peripheral rollers mounted on a corresponding plurality of peripheral axles aligned tangentially about the wheel and radially spaced from the main axis, the peripheral axle being one of the plurality of peripheral axles and comprising:

a head portion engageable to an axle shaft of an adjacent peripheral axle of the plurality of peripheral axles, the head portion of the peripheral axle being separate from a head portion of the adjacent peripheral axle and separate from a wheel body of the wheel comprising a central hub of the wheel.

\* \* \* \* \*